(12) United States Patent
Peterson et al.

(10) Patent No.: US 7,419,421 B2
(45) Date of Patent: Sep. 2, 2008

(54) SLIDER HAVING ROUNDED CORNERS AND EDGES, AND METHOD FOR PRODUCING THE SAME

(75) Inventors: James R. Peterson, Eden Prairie, MN (US); Todd A. Luse, Delano, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 459 days.

(21) Appl. No.: 10/838,285

(22) Filed: May 4, 2004

(65) Prior Publication Data
US 2005/0248884 A1 Nov. 10, 2005

(51) Int. Cl.
*B24B 1/00* (2006.01)
(52) U.S. Cl. .............................. 451/36; 451/41; 451/44; 451/59; 451/299; 451/304; 29/603.12
(58) Field of Classification Search .................. 451/36, 451/37, 41, 44, 59, 168, 304, 299, 311; 29/603.12, 29/603.07, 737
See application file for complete search history.

(56) References Cited

U.S. PATENT DOCUMENTS

| | | | |
|---|---|---|---|
| 5,827,424 A | 10/1998 | Gillis et al. | |
| 5,858,140 A * | 1/1999 | Berger et al. | 156/62.2 |
| 5,872,686 A | 2/1999 | Dorius et al. | |
| 5,885,131 A * | 3/1999 | Azarian et al. | 451/5 |
| 5,997,755 A | 12/1999 | Sawada | |
| 6,093,084 A * | 7/2000 | Jefferies | 451/37 |
| 6,166,879 A | 12/2000 | Jordan | |
| 6,236,542 B1 | 5/2001 | Hartog et al. | |
| 6,328,642 B1 * | 12/2001 | Pant et al. | 451/307 |
| 6,361,399 B2 * | 3/2002 | Kobayashi et al. | 451/5 |
| 6,452,750 B1 | 9/2002 | Fukuroi et al. | |
| 6,500,049 B2 * | 12/2002 | Orii et al. | 451/36 |
| 6,542,334 B2 | 4/2003 | Polycarpou et al. | |
| 6,585,574 B1 * | 7/2003 | Lombardo et al. | 451/285 |
| 2002/0004357 A1 * | 1/2002 | Baker et al. | 451/41 |
| 2002/0089787 A1 | 7/2002 | Lu et al. | |
| 2003/0192167 A1 | 10/2003 | Beckle et al. | |

* cited by examiner

*Primary Examiner*—Eileen P. Morgan
(74) *Attorney, Agent, or Firm*—Kinney & Lange P.A.

(57) ABSTRACT

A slider body characterized by rounded corners and edges and smooth surfaces, formed by polishing with a polymeric fiber and a free abrasive slurry of submicron particles.

24 Claims, 5 Drawing Sheets

SLIDER HAVING ROUNDED CORNERS AND EDGES, AND METHOD FOR PRODUCING THE SAME

BACKGROUND OF THE INVENTION

The present invention relates to sliders, and in particular, to a slider having rounded corners and edges, and smooth surfaces for reducing particle contamination within a disc drive assembly.

Disc drive systems include disc drive suspensions for supporting sliders over information tracks of a rotatable disc. Typically, suspensions include a load beam having a mounting region on a proximal end, a flexure on a distal end, a relatively rigid region adjacent to the flexure, and a spring region between the mounting region and the rigid region. An air bearing slider is supported by the flexure. The mounting region is typically attached to a base plate for mounting the load beam to an actuator arm. A motor, which is controlled by a servo control system, rotates the actuator arm to position the slider over the desired information tracks on the disc. This type of suspension is used with both magnetic and non-magnetic discs.

A slider reads data from or writes data to each magnetic disc and is designed to fly at a certain height above the magnetic disc during operation. The slider does come into contact with the magnetic disc surface as the slider is being lifted off or landing onto the disc. The geometry of the slider includes sharp corners or edges that can cause indentations on the disc at the place of impact between the slider and the magnetic disc. This, in turn, can result in the loss of data at the point of impact.

Slider geometry also plays a role in producing hard particles that damage discs or result in ultimate failure of the disc drive. Failures result from these hard particles entering into the head-disc interface and either scratching the magnetic media or embedding into the disc. One prominent source for these particles is the slider itself. The fabrication process for sliders includes slicing and dicing operations that leave corners and edges rough, cracked, and laden with hard particles.

In the field of disc drives, ceramic (hard) particles are a major source of damage to sliders and the disc media. Cleaning has been the primary method for hard particle removal, but cleaning weakens the grain boundaries and causes more particles to be freed. Some prior systems have tried to minimize particles by cleaning of the suspension assembly in an aqueous or solvent system, but have not succeeded because the particle reduction eventually plateaus. Other systems use glob-top encapsulants to minimize particles, but such encapsulants are not useful in a drive environment due to contamination issues and microactuator stroke reduction.

Various slider designs address the problem of hard particle contamination, but they all have shortcomings that limit the effectiveness and practicability of their methodology. Many designs increase the complexity of designing and fabricating the slider, while other designs are unable to sufficiently reduce the level of hard particle contamination. Therefore, those prior designs do not present ideal hard particle contamination solutions.

More recent slider designs employ complicated methods that utilize polishing pads, wire assisted polishing, radiation coating, and chamfered cuts to produce rounded corners and edges and also to reduce hard particle contamination. An inexpensive treatment that smooths the diced surfaces and rounds corners and edges, and also fits into the existing slider manufacturing process, is needed in the art. The existing art does not include a method for fabricating a slider with rounded corners, edges, and smooth surfaces through a polishing process that incorporates a polymeric fiber and a free abrasive slurry of submicron particles.

BRIEF SUMMARY OF THE INVENTION

The present invention relates to a slider body having a leading end, a trailing end, first and second sides, an air bearing surface, and an opposite non-air bearing surface. The slider body includes corners where the ends, sides and surfaces intersect, and edges where the surfaces and the sides intersect. The slider body is further characterized by rounded corners and edges and smooth surfaces formed by polishing with a polymeric fiber and a free abrasive slurry of submicron particles.

DETAILED DESCRIPTION

Figure 1:
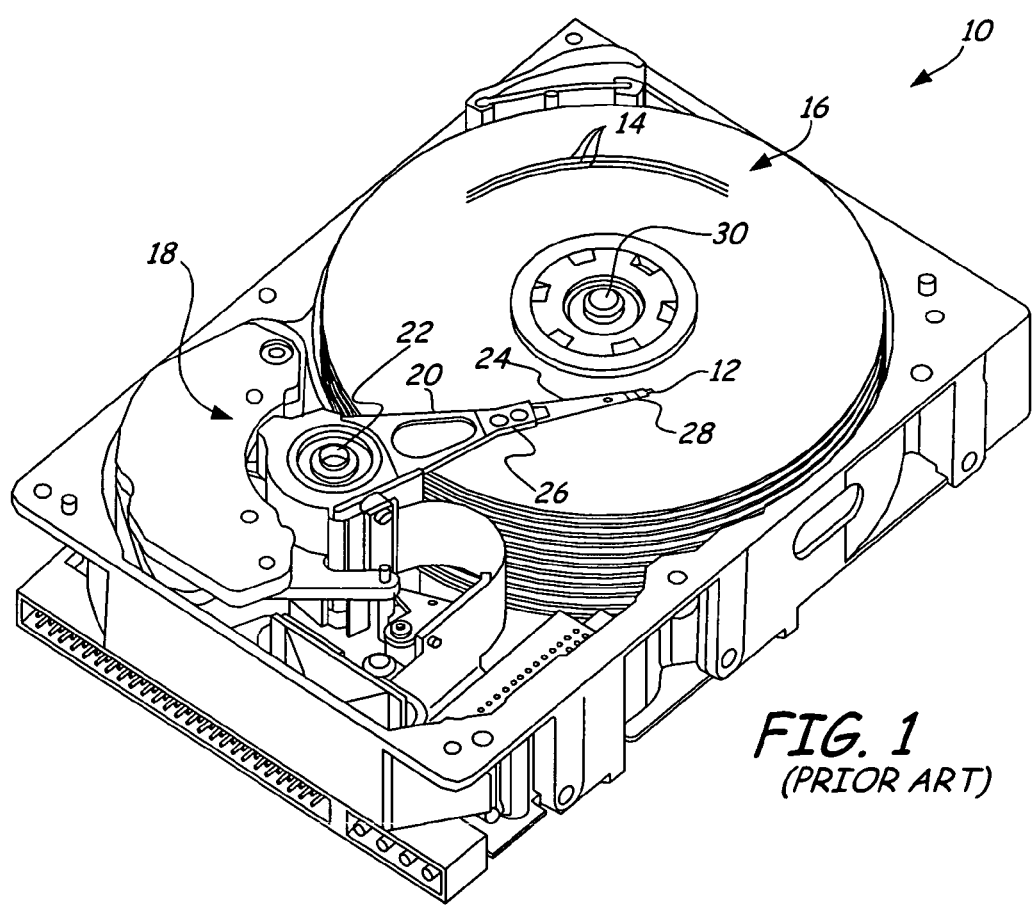
FIG. 1 is a perspective view of a disc drive.

FIG. 1 is a perspective view of a disc drive 10. Disc drive 10 includes a slider 12, tracks 14, and discs 16. Disc drive 10 includes a voice coil motor (VCM) 18 (or main actuator) arranged to rotate an actuation arm 20 on a spindle about an axis 22. A head suspension 24 is connected to actuator arm 20 at a head mounting block 26. A flexure 28 is connected to an end of head suspension 24, and carries slider 12. Slider 12 carries a transducing head (not shown in FIG. 1) for reading and/or writing data on concentric tracks 14 of disc 16. Disc 16 rotates around axis 30, so that windage is encountered by slider 12 to keep slider 12 aloft a small distance above the surface of disc 16.

Disc drive failures often result from hard particles entering the head-disc interface and either scratching the magnetic media or embedding into disc 16. Sliders are a prominent source for hard particles. The fabrication process for sliders requires mechanical slicing and dicing operations that leave the corners and edges rough, cracked, and laden with hard particles that can easily be released and will result in scratching of the magnetic media and/or embedding into disc 16.

The present invention is directed to a slider, or slider body, having rounded corners and edges, and smooth surfaces formed by polishing with a polymeric fiber and a free abrasive slurry, which reduces hard particle generation and thereby contamination within the disc drive assembly.

Figure 2:
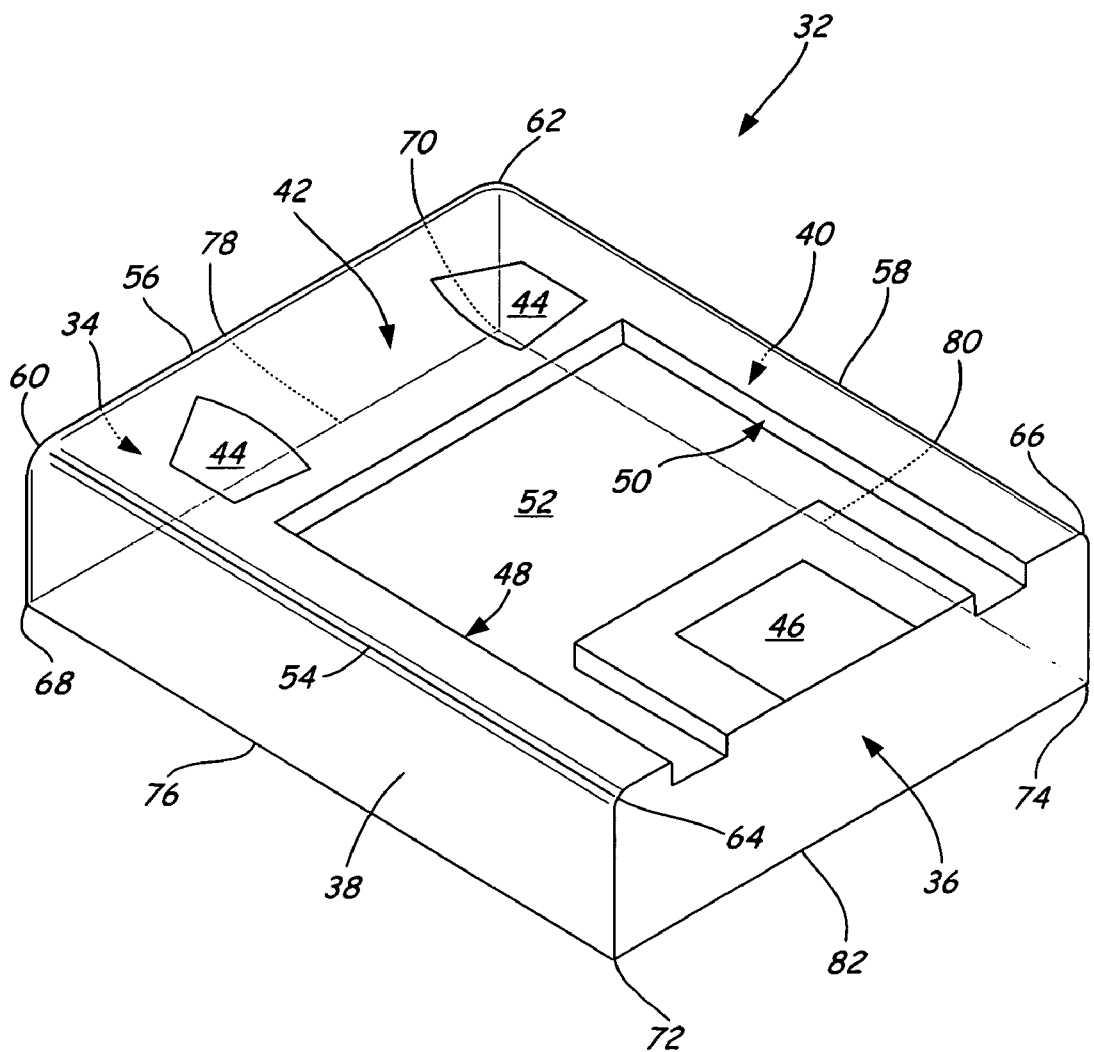
FIG. 2 is a perspective view, inverted from the position shown in FIG. 1, of a slider body having rounded corners and edges, and smooth surfaces.

FIG. 2 is a perspective view, inverted from the image in FIG. 1, of a slider 32. Slider 32 includes a leading end 34, a trailing end 36, a first side 38, a second side 40, an air bearing surface 42 facing upward in FIG. 2, and an opposite non-air bearing surface (not shown) facing downward in FIG. 2. In the embodiment shown in FIG. 2, air bearing surface 42 is configured to include leading pads 44, a trailing pad 46, side rails 48 and 50, and a negative pressure region 52 recessed from air bearing surface 42. In further embodiments, air bearing surface 42 of slider 32 has different configurations.

Slider 32 includes rounded edges 54, 56 and 58. Rounded edge 54 is located where side 38 intersects with air bearing surface 42, edge 56 is located where leading end 34 intersects with air bearing surface 42, and edge 58 is located where side 40 intersects with air bearing surface 42. Rounded corners 60 and 62 are located at leading end 34 and rounded corners 64 and 66 are located at trailing end 36. In particular, rounded corner 60 is located at the intersection of edge 54 and leading end 34, rounded corner 62 is located at the intersection of edge 58 and leading end 34, rounded corner 64 is located at the intersection of edge 54 and trailing end 36, and rounded corner 66 is located at the intersection of edge 58 and trailing end 36.

Slider 32 also includes substantially sharp corners 68, 70, 72, and 74 and substantially straight edges 76, 78, 80, and 82. In further embodiments, fewer or more edges and corners are rounded. For example, every corner of slider 32 is rounded and every edge of slider 32 is rounded, or any combination of fewer edges and corners are rounded.

Sides 34, 38 and 40 of slider 32 are smoothed by the present invention for polishing whereas side 36, air bearing surface 42 and the surface opposite the air bearing surface (not shown) are less smooth. In further embodiments, fewer or more surfaces are smoothed. For example, in other embodiments the surface opposite the air bearing surface (not shown), and 34, 36, 38, and 40 are all smoothed, or any number of combinations of fewer or more surfaces, sides, and ends are smoothed.

Rounded corners 60, 62, 64, and 66 and edges 54, 56, and 58 together with smooth sides 34, 38, and 40 of slider 32, reduce the amount of hard particles generated by slider 32. Rounding removes loose and passively fixed hard particles from corners 60, 62, 64, and 66. Smoothing edges 54, 56, and 58, leading end 34, and sides 38 and 40 eliminates "hiding places" for colloidal debris generated during slider 32 fabrication.

Figure 3:
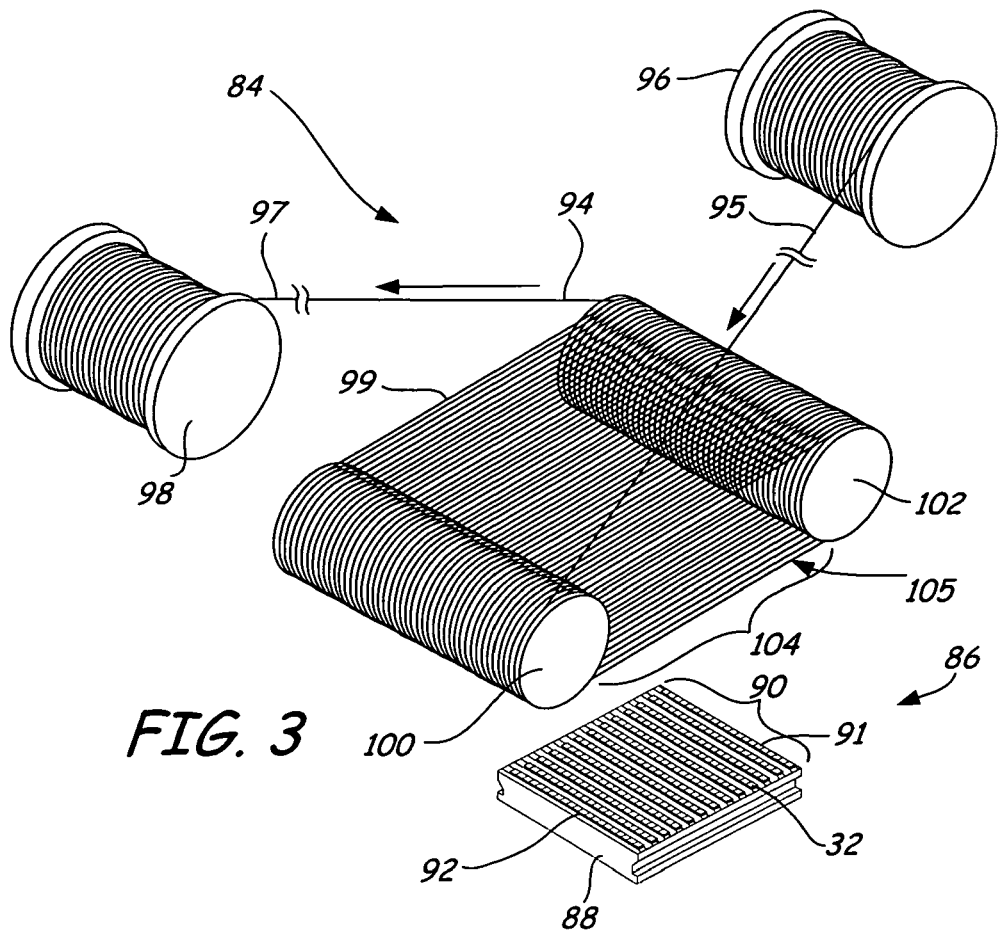
FIG. 3 is a perspective view of a reel-to-reel polymeric fiber web and an array of multiple slider bodies.

FIG. 3 is a perspective view of a reel-to-reel polymeric fiber web 84 and an array 86 of multiple slider bodies 32. Array 86 is comprised of a substrate 88 with a polymer material (not shown) substantially surrounding each row 90 of slider bodies. Each row 90 of slider bodies is attached to substrate 88 with an adhesive (not shown). Exposed surface 91 on row 90 of slider bodies 32 undergoes patterning to process air bearing surface 42 of each slider 32. Array 86 of multiple slider bodies is then singulated into individual slider bodies 32 by dicing the substrate and polymer material, along a dice lane 92, in a direction substantially perpendicular to the length of the row 90 of slider bodies 32. After dicing and while the newly singulated slider bodies are still attached to substrate 88, the inventive polishing process is performed.

A polymeric fiber 94, with a first end 95 wound around a supply reel 96 and a second end 97 wound around a take-up reel 98, has an intermediate portion 99 located between first end 95 and second end 97 of polymeric fiber 94. Polymeric fiber 94 is made from an ultra-high molecular weight polyethylene derivative, of which someone skilled in the art would know where to find. Polymeric fiber 94 has characteristics of being able to deform both vertically and horizontally, withstand pressure in a range of about 5 to about 40 Newtons, and having a diameter in a range of about 0.1 to about 0.2 millimeters.

Intermediate portion 99 of polymeric fiber 94 is wrapped around a first work roller 100 and a second work roller 102. Polymeric fiber 94 and work rollers 100 and 102, together, form reel to reel polymeric fiber web 84. The portion of reel to reel polymeric fiber web 84 that interacts with array 86 of multiple slider bodies 32 is called a contact area 104. Array 86 of multiple slider bodies 32 is positioned below contact area 104 of reel to reel polymeric fiber web 84. In further embodiments, fewer or more work rollers may be used to form web 84.

Figure 4:
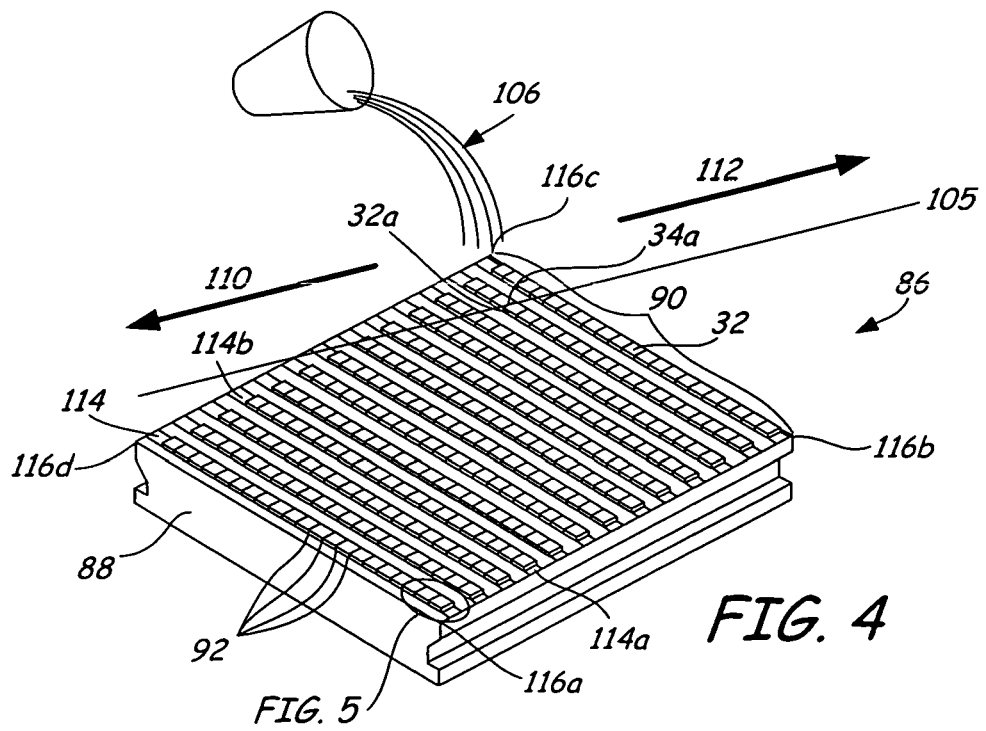
FIG. 4 is a top perspective view of a polymeric fiber and a free abrasive slurry engaging the array of multiple slider bodies.

FIG. 4 is a top perspective view of a polymeric fiber segment 105 and a free abrasive slurry 106 engaging array 86 of multiple slider bodies 32. Polymeric fiber segment 105 shown in FIG. 4 is a single segment of reel to reel polymeric fiber web contact area 104 shown in FIG. 3, enlarged to show how polymeric fiber segment 105, along with free abrasive slurry 106, moves over and across array 86.

Polymeric fiber segment 105 of reel to reel polymeric fiber web contact area 104 is optically aligned with a side of slider 32, in FIG. 2, for example to leading end 34a of slider 32a located on array 86. Any slider 32 located on array 86 could be used for optical aligning of polymeric fiber segment 105. Optical alignment of polymeric fiber segment 105 to slider 32 allows for the rest of polymeric fiber web contact area 104 to be aligned to other individual slider bodies on array 86 because each slider body is identical in size, shape, and proximity to every other slider on array 86.

Polymeric fiber segment 105 moves across array 86 of multiple slider bodies. Then, free abrasive slurry 106 is applied to polymeric fiber segment 105 either manually or through mechanical spray jets (not shown). Polymeric fiber segment 105 "carries" free abrasive slurry 106 over and across array 86 of multiple slider bodies. Polymeric fiber segment 105 moves across array 86 at a rate of about 1 meter per minute to about 18 meters per minute.

Free abrasive slurry 106 is either an aqueous-based or oil-based carrier containing synthetic submicron particles. The submicron particles, for example, can be synthetic diamonds with a diameter in the range of about 0.1 micrometers to about 1.0 micrometers. The submicron particles are harder than the material forming the slider. The submicron slurry particles are combined with the carrier in a concentration range of about 0.01 to about 0.1 particles per milliliter of carrier.

The free abrasive slurry particles collide with the corners, edges, and surfaces of each slider in direct relation to how fast polymeric fiber segment 105 is moving. The faster polymeric fiber segment 105 is moving, the more force with which the free abrasive slurry particles collide with each slider on array 86. The collisions cause erosion of hard slider particles on the corners, edges, and surfaces of the slider, leaving corners and edges that are rounded and surfaces that are polished smooth. After rounding and polishing is completed, water (not shown) is added to remove free abrasive slurry 106 and eroded particles (not shown) from array 86 of multiple slider bodies. The water is applied in the same manner that free abrasive slurry 106 is applied.

Polymeric fiber segment 105 moves over array 86 of multiple slider bodies in one of two ways. The first type of movement is streaming, whereby polymeric fiber segment 105 moves continuously in a first direction 110 over the array of multiple slider bodies 86. The second type of movement is reciprocating, whereby polymeric fiber 105 moves over array 86 of multiple slider bodies back and forth in first direction 110 and an opposite second direction 112.

The ability of polymeric fiber segment 105 to either stream or reciprocate across array 86 of multiple slider bodies allows for a predictable amount of damage to polymeric fiber segment 105. If streaming is used, a predictable amount of damage is ascertained because the segment of polymeric fiber web contact area 104 that does the rounding and polishing on one slider 32 in array 86 is the same segment of polymeric fiber web contact area 104 that does the polishing on another slider in array 86. If polymeric fiber segment 105 is reciprocating, however, each slider in array 86 of multiple slider bodies will be rounded and polished using a different segment of polymeric fiber web contact area 104.

A sacrificial polymer material 114 provides a barrier between polymeric fiber segment 105 and substrate 88 to protect polymeric fiber segment 105 while polymeric fiber segment 105 is moving across array 86. Substrate 88 contains sharp ends 116a, 116b, 116c, and 116d. These sharp ends will damage polymeric fiber segment 105 if prolonged contact is allowed while polymeric fiber segment 105 is moving. One example of sacrificial polymer material 114 is made from polyurethane epoxy that is "softer" than substrate 88 and polymeric fiber segment 105 so that segment 105 can cut through polymer material 114 during the polishing process. Sacrificial polymer material 114a and 114b is in two locations along each row 90 on array 86 of multiple slider bodies.

Figure 5:
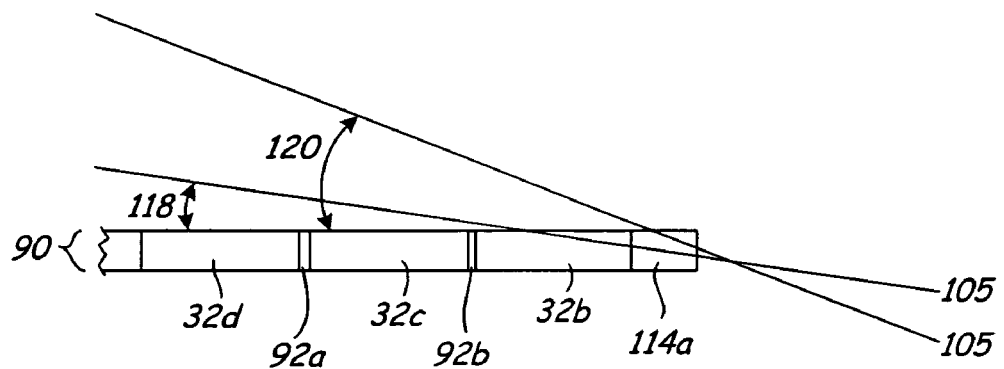
FIG. 5 is a cross-sectional view of a single row of slider bodies, within the array of multiple slider bodies, being polished by the polymeric fiber.

FIG. 5 is a cross-sectional view of single row 90 of slider bodies, within array 86 of multiple slider bodies (as shown in FIG. 4), being polished by polymeric fiber segment 105. Slider bodies 32b, 32c, and 32d are separated by dice lanes 92a and 92b. Reel to reel polymeric fiber web rotates polymeric fiber segment 105 through various angles with respect to row 90 (e.g., angles 118 and 120) and the array is vertically positioned to allow continuous fiber-slider engagement. Sacrificial polymer material 114a protects polymeric fiber segment 105 from contacting the sharp ends (not shown) of array 86 of multiple slider bodies by providing a soft barrier between the sharp ends and segment 105.

Figure 6:
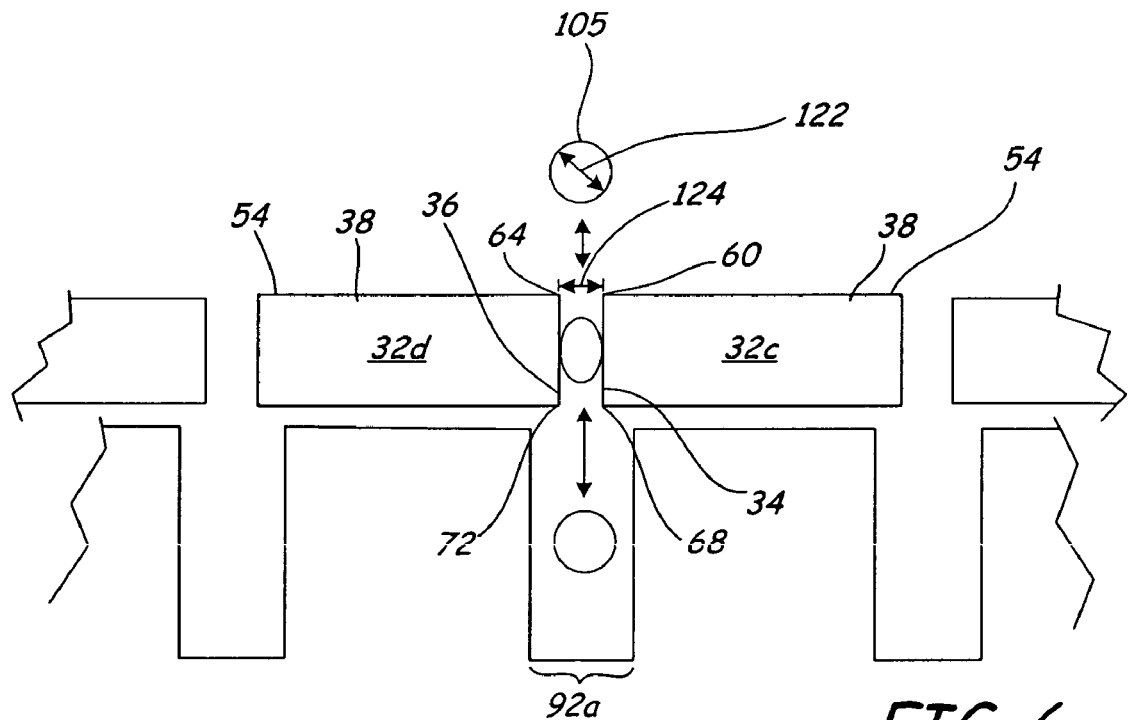
FIG. 6 is a side view of the polymeric fiber entering a dice lane between two slider bodies.

FIG. 6 is a side view of polymeric fiber segment 105 of polymeric fiber 94 entering dice lane 92a between two slider bodies 32b and 32c. Polymeric fiber 94 is made from a polyethylene derivative and possesses the ability to vertically and horizontally deform. Polymeric fiber 94 is able to deform under pressure in a range of about 2 to about 5 Newtons without breaking.

As polymeric fiber segment 105 enters dice lane 92a between two slider bodies 32c and 32d, the polymeric fiber deforms because a diameter 122 of polymeric fiber segment 105 is larger than a width 124 of dice lane 92a. A pressure gradient is created above and below the polymeric fiber as polymeric fiber deforms to enter dice lane 92a. The pressure gradient causes hard slider particles to erode as free abrasive slurry is dragged through dice lane 92a by polymeric fiber segment 105. The pressure gradient, along with the speed polymeric fiber segment 105 is moving, erodes hard slider particles by colliding free abrasive slurry particles against hard slider particles, thus rounding corners 60, 64, 68, and 72, edge 54 and polishing ends 34 and 36, and side 38 smooth.

Figure 7:
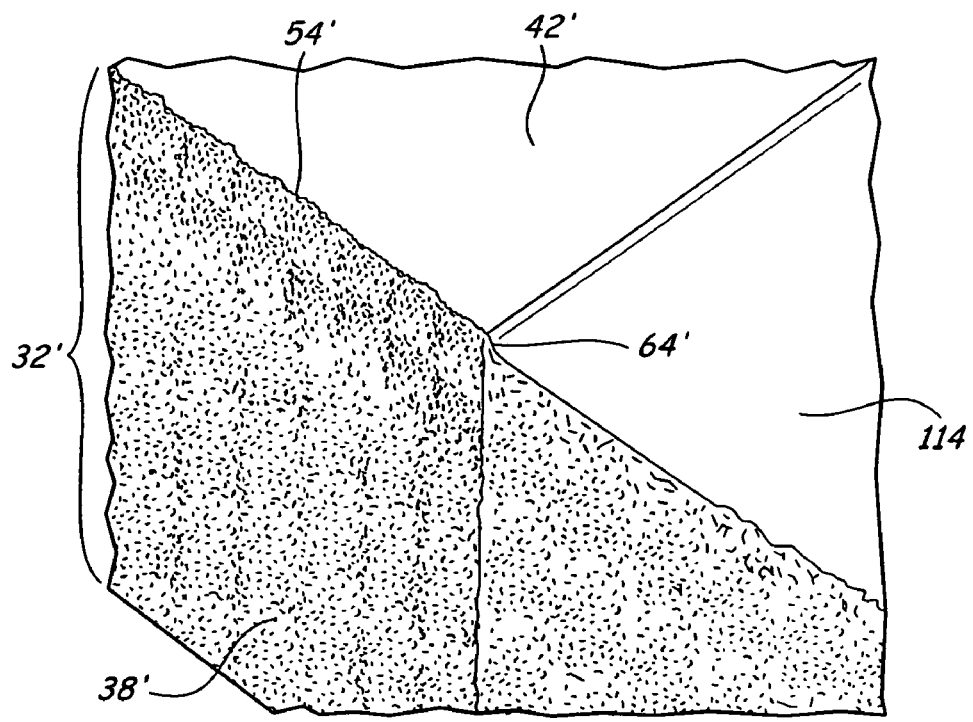
FIG. 7 is a top perspective view of a post-diced edge of the slider body.
Figure 8:
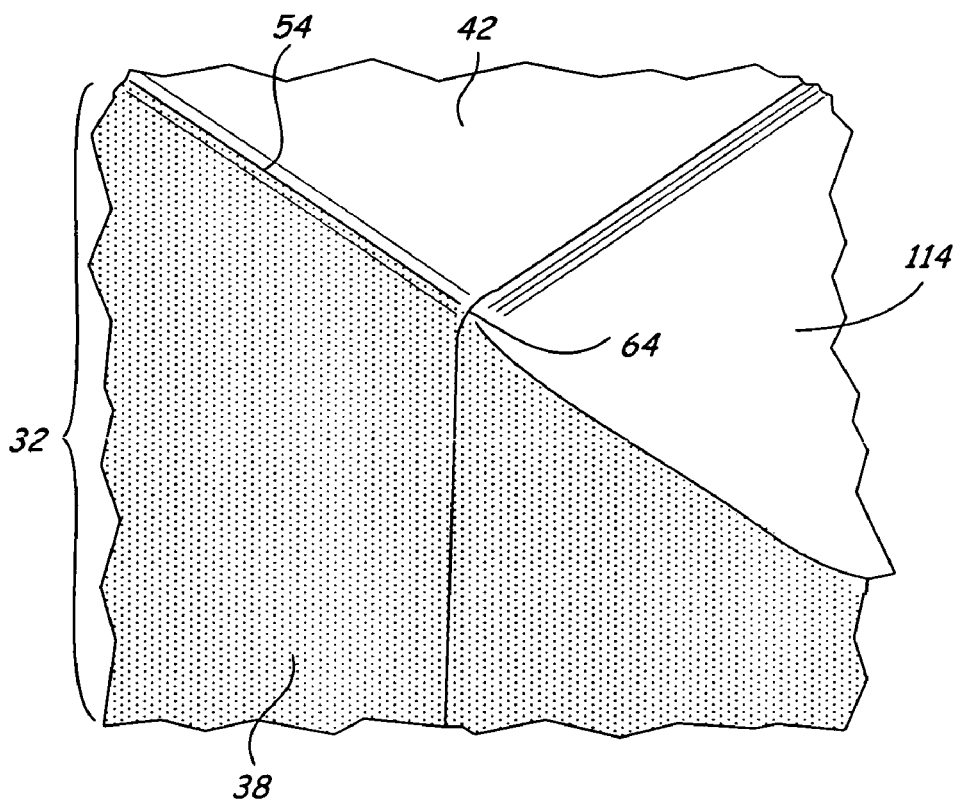
FIG. 8 is a top perspective view of the post-diced edge of the slider body after polishing by the polymeric fiber and the free abrasive slurry.

FIGS. 7 and 8 show before and after views of a post-diced side of a slider body. FIG. 7, the before view, shows side 38' as not smooth. FIG. 8, the after view, shows the same side (38) as FIG. 7, after it has been polished with the polymeric fiber and free abrasive slurry. The before features of FIG. 7 are identified by prime symbols for the respective after features in FIG. 8.

FIG. 7 is a top perspective view of post-diced side 38' of slider 32'. Air bearing surface 42', corner 64', and sacrificial polymer material 114 are also shown in FIG. 7. Side 38' of slider 32' is not smooth and corner 64' and edge 54' are sharp, and therefore both hold a high potential for releasing hard particle contaminants into disc drive 10. Edge 54' and edge 58' (not shown) of air bearing surface 42' become less smooth and an elevated ridge, elevated in relation to air bearing surface 42', is formed thereon when slider 32' is singulated. This is due to a compressive stress that is introduced during the slider-singulation process.

FIG. 8 is a top perspective view of post-diced side 38 of slider 32 after the polymeric fiber (not shown) and free abrasive slurry (not shown) treatment. Air bearing surface 42, rounded corner 64, and polymer material 114 are also shown in FIG. 8. After polishing with the present inventive process, side 38 of slider 32 is more smooth and corner 64 and edge 54 are substantially rounded, as shown with respect to FIG. 7. Also through polishing, the stress layer of edge 54 and edge 58 (not shown) is removed leaving rounded edges and eliminating the ridge. Reducing the height of the ridge is key to lower fly heights by slider 32. The rounding and polishing smooth of slider 32 vastly reduces the potential for releasing hard particle contaminants into disc drive 10.

The method of the present invention substantially eliminates hard particle contamination in a disc drive by producing a slider with rounded corners and edges and smooth surfaces. The method comprises polishing individual slider bodies with a polymeric fiber and a free abrasive slurry, and removing eroded slider particles and slurry particles with water.

The polymeric fiber and free abrasive slurry polishing method for rounding of diced corners and edges and smoothing surfaces of a slider provides a cost effective solution that is easily incorporated into existing slider fabrication methods.

Although the present invention has been described with reference to preferred embodiments, workers skilled in the art will recognize that changes may be made in form and detail without departing from the spirit and scope of the invention

The invention claimed is:

1. A method for smoothing and rounding corners, edges, and surfaces of a, the method comprising:
   moving a polymeric fiber over the slider body; and
   applying a free abrasive slurry to the slider body, such that the free abrasive slurry is carried by the polymeric fiber and erodes the slider body to polish surfaces, corners, and edges of the slider body.

2. The method of claim 1 wherein the polymeric fiber is made from a polyethylene derivative.

3. The method of claim 1 wherein the polymeric fiber is fused.

4. The method of claim 1 wherein a first end of the polymeric fiber is wound around a supply reel and a second end of the polymeric fiber is wound around a take-up reel.

5. The method of claim 1 wherein an intermediate portion of the polymeric fiber is wound around at least two work rollers at least one time.

6. The method of claim 5 wherein the intermediate portion moves between the at least two work rollers to polish the slider body.

7. The method of claim 1 wherein the polymeric fiber withstands tension in a range of about 5 to about 40 Newtons.

8. The method of claim 1 wherein the polymeric fiber travels in a velocity range of about 1 to about 18 meters per minute.

9. The method of claim 1 wherein the polymeric fiber is deformable in a vertical direction and in a horizontal direction.

10. The method of claim 1, and further comprising moving the polymeric fiber in a first direction across the slider body.

11. The method of claim 1, and further comprising moving the polymeric fiber back and forth across the slider body in a first direction and a second opposite direction.

12. A method for fabricating slider bodies having smooth surfaces and rounded corners and edges, the slider bodies forming an array of slider bodies comprising at least two rows of slider bodies, the method comprising:
    moving a polymeric fiber over the array of slider bodies;
    applying a free abrasive slurry to the array of slider bodies, such that the free abrasive slurry is carried by the polymeric fiber and erodes the slider bodies to polish the smooth surfaces of the slider bodies and to form the rounded corners and edges of the slider bodies; and
    removing eroded particles and free slurry particles from the array of slider bodies.

13. The method of claim 12 wherein moving the polymeric fiber over the array of slider bodies comprises streaming the polymeric fiber by moving the polymeric fiber continuously in a first direction.

14. The method of claim 12 wherein moving the polymeric fiber over the array of slider bodies comprises reciprocating the polymeric fiber back and forth in a first direction and an opposite second direction.

15. The method of claim 12 wherein the polymeric fiber has a diameter in a range of about 0.1 millimeters to about 0.2 millimeters.

16. The method of claim 12 further comprising optically aligning the polymeric fiber with a leading end of a slider body in the array of slider bodies.

17. The method of claim 12 wherein the free abrasive slurry comprises a carrier and a plurality of submicron synthesized particles.

18. The method of claim 17 wherein the carrier is aqueous-based.

19. The method of claim 17 wherein the earner is oil-based.

20. The method of claim 17 wherein the submicron synthesized particles are made from synthetic diamond.

21. The method of claim 17 wherein the submicron synthesized particles have a diameter between about 0.1 micrometers and about 1.0 micrometers.

22. The method of claim 17 wherein the submicron synthesized particles are combined with the carrier in a concentration range of about 0.01 submicron particles per milliliter of carrier to about 0.1 submicron particles per milliliter of carrier.

23. The method of claim 12 wherein removing eroded particles and free slurry particles comprises adding water to the array of slider bodies.

24. The method of claim 12 wherein a polymer material substantially surrounds each of the plurality of rows of slider bodies, and wherein the polymer material comprises a polyurethane epoxy.

* * * * *